Patented Feb. 17, 1925.

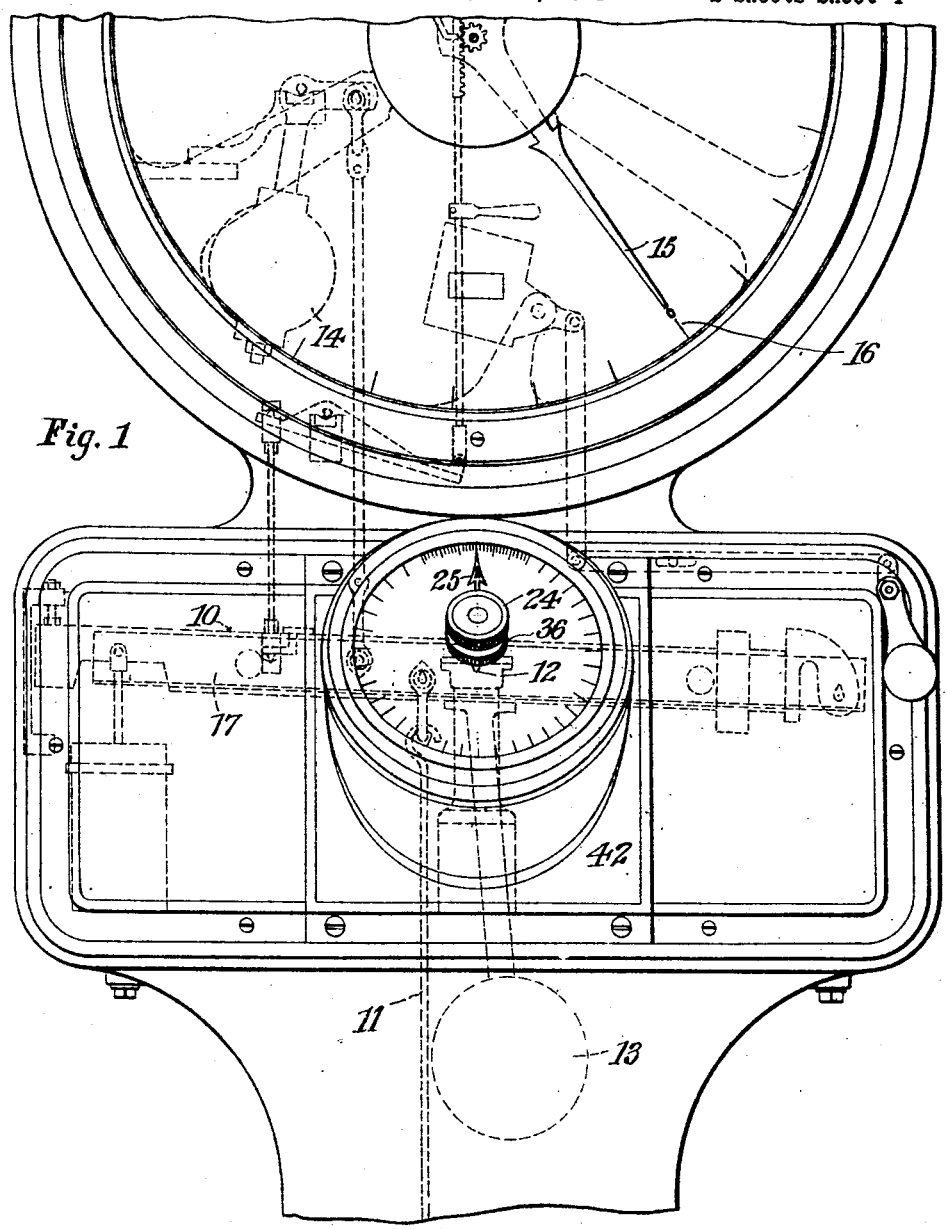

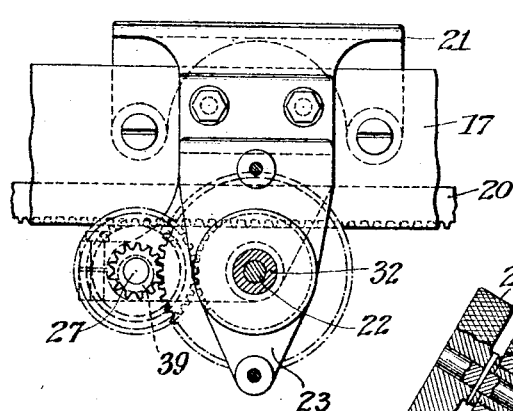
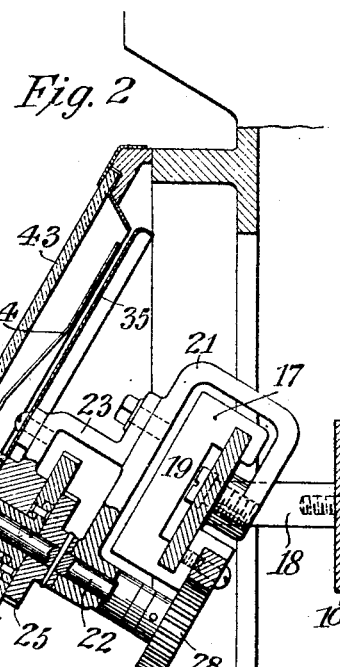
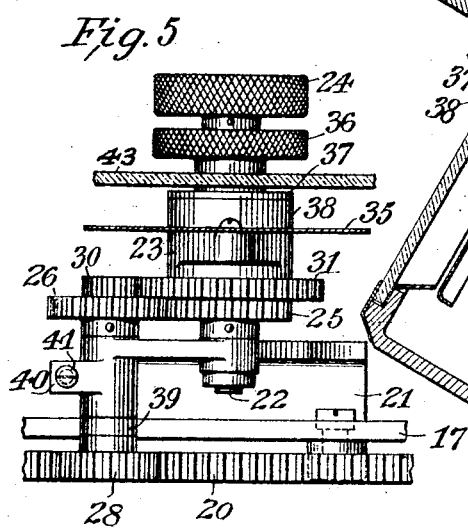
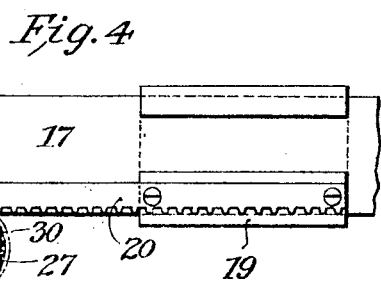

1,526,433

UNITED STATES PATENT OFFICE.

LOUIS A. OSGOOD, OF DAYTON, AND ELMER E. WOLF, OF SPRINGFIELD, OHIO, ASSIGNORS TO INTERNATIONAL SCALE COMPANY, OF DAYTON, OHIO, A CORPORATION OF ILLINOIS.

TARE SETTING AND INDICATING DEVICE FOR SCALES.

Application filed November 22, 1921. Serial No. 516,952.

*To all whom it may concern:*

Be it known that we, LOUIS A. OSGOOD and ELMER E. WOLF, both citizens of the United States, OSGOOD residing at Dayton, Montgomery County, Ohio; WOLF residing at Springfield, Clark County, Ohio, have invented certain new and useful Improvements in Tare Setting and Indicating Devices for Scales, of which the following is a full, clear, and exact description.

The present invention relates to improvements in tare devices for scales, and more particularly to improvements in means for setting the tare poise or poises and for indicating the amount of tare.

Other objects and advantages will be set forth in the accompanying specification and shown in the drawings, which show by way of exemplification a preferred embodiment of the invention.

Fig. 1 shows a front view of the scale.

Fig. 2 is a central section.

Fig. 3 is a detail enlarged front view of the tare poise and beam and gearing therefor.

Fig. 4 is a rear view of the same parts.

Fig. 5 is a detail bottom plan view of the setting devices and gearing to the tare poise rack and tare indicator.

The scale to which we have shown our improvements is of a type well known to the trade as an International No. 601 scale. In general it comprises a scale beam 10 having connected thereto a draft rod 11 and fulcrumed upon a suitable pivot 12. The beam is provided with any suitable automatic counterbalancing means such as pendulums 13 and 14. A pivotal weight indicator 15 is suitably connected to the beam and is adapted to sweep over a weight dial 16 to indicate the load.

The scale is also provided with the usual dash pot and capacity weight device.

The tare beam 17 is preferably disposed at an angle to the horizontal as shown in Fig. 2, and is inter-connected to the main beam 10 by means of the usual studs 18. Slidable upon the tare beam is a poise member 19 which preferably embraces the beam as shown in Fig. 2. Fastened to the poise is a rack 20.

A bracket member 21 is secured to the tare beam by suitable studs and extends downwardly beyond the beam and is provided with a drilled opening forming an inner bearing for stud 22. The bracket 21 has fastened to it a supplementary bracket 23 (see Figs. 2 and 3) which forms a support for certain parts of the driving gear train and for the tare indicating dial.

The setting of the tare poise is effected by turning a knurled knob 24. This knob is rigidly secured to stud 22 and this stud has fastened to it a pinion 25 which meshes with a pinion 26 which in turn is pinned to a stud 27. This latter stud upon its end carries a pinion 28 which enmeshes with rack 20 and thereby variably displaces the poise 17 upon the turning of the knob 24. The gear ratios of the driving gear train are properly proportioned to enable the poise to be set easily and accurately by the operator.

It is found that it is desirable to utilize a different driving ratio between the setting device and poise and the setting device and tare indicator. To provide this drive, the stud 27 carries a pinion 30 considerably smaller than the adjacent pinion 26. Pinion 30 enmeshes with a gear of comparatively large diameter 31 and is adapted to drive an annular tubular member 32 which surrounds stud 22, and which is journaled to rotate in the bracket 23 (see Fig. 2). This tubular member has clamped to it an annular collar 33 which in turn carries a pointer or indicator 34 which sweeps over a tare dial 35. The tare dial is disposed at an angle to the horizontal to facilitate the reading thereof and is preferably carried by the supplementary bracket 23 in the manner shown in Fig. 2. The tare dial is suitably graduated to indicate the amount of load offset by the tare poise.

By reason of the multiple driving gear train between the setting knob 24 and the tare poise and indicator it is possible to turn the setting poise through a plurality of revolutions and thus set the poise with the minimum manual effort. The indicator 34 while rotating concurrently with the setting knob rotates at a slower rate of speed, thereby avoiding multiple rotation of the pointer, and complicating the dial reading. The multiple gear trains provide for displacing the poise at one linear velocity and the pivotal indicator at a different linear velocity.

In certain weighing operations it may be desirable to lock the tare poises at a predetermined point upon the scale beam. To effect such locking, the tubular member is threaded on its end and this portion carries a supplementary locking knob 36 which may be rotated to clamp a disk 37 against a spacing collar 38. This spacing collar abuts against the fixed bracket 23 and by tightening the knob 36 sufficiently the setting devices may be locked in any desired position thereby locking the poise 19 in position upon beam 17.

In devices of this sort it is desirable that means be provided for adjusting the depth of enmeshment of the pinions. Accordingly the stud 27 is rotatably supported in an eccentric adjusting sleeve 39 which in turn is carried by an extension 40 from bracket 21. By loosening the screw 41 the adjusting sleeve may be unclamped and then turned to bring the various gears carried by stud 27 into the proper relation with the coacting enmeshed gears.

The entire assemblage of tare setting devices and indicators is preferably enclosed in a housing 42 having a suitable glass cover plate 43 operated at the center to permit the setting and locking knobs to extend therethrough. Suitable clearance is provided between the outer periphery of the locking knob and the glass plate to permit the swinging of the beam. This swinging movement is very slight at this point, since the knobs 24 and 36 are substantially in alignment with the fulcrum 11 of the main scale beam 10.

We claim—

1. In a weighing scale in combination with a scale beam, a tare beam connected thereto, a tare poise therein, means carried by a bracket member fixed on the tare beam for variably positioning the poise upon the beam and indicating the amount of load offset thereby, said means comprising a manually operable setting device and means for actuating said poise and indicator relatively to its dial concurrently at different linear velocities upon the operation of said manually operable device.

2. In a weighing scale in combination with a scale beam, a tare beam connected thereto, a tare poise thereon and means carried by a bracket member fixed on the tare beam for setting said poise upon said beam and indicating the amount of load offset thereby, said means comprising a manually operable member, a movable indicating device and a multiple gear train intermediate the manually operable member and poise and the movable indicator, said train having varying driving ratios whereby the poise is driven at one linear velocity and the indicator at a different linear velocity with respect to its cooperating dial.

3. In a weighing scale having a tare beam and a shiftable poise thereon, a tare dial carried by the tare beam and disposed at an angle to a horizontal plane to facilitate the reading thereof, a manually operable setting device, driving connections therefrom to the said poise, said setting device and driving connections being positioned adjacent the beam fulcrum whereby swinging movement of the beam is minimized during the adjustment of the setting device, an indicator traversing said dial, and driving connections therefrom to the setting device.

4. In a weighing scale, in combination, a fulcrumed main scale beam, an automatic counterbalance therefor, said beam assuming variable positions under varying loads, a tare beam connected to the main beam, a tare poise thereon, a setting device for said poise, a tare indicator comprising a fixed element carried by the tare beam and a movable element driven by the setting device, said setting device moving with the main beam and being disposed substantially in alignment with the fulcrum thereof to minimize the displacement when the beam swings under applied loads.

5. In a weighing scale in combination with an automatically counterbalanced main scale beam, a tare beam, carrying a slidable poise, connected thereto, a bracket structure connected to said tare beam, setting devices carried by said structure and comprising a manually operable member, a gear train driven thereby and extending to said poise to displace the same upon the adjustment of the manually operable member, a second gear train operating concurrently with the first train, an indicator connected to be driven by said second gear train, and a fixed dial carried by said bracket structure over which the indicator is adapted to sweep.

6. The invention set forth in claim 5 in which a supplementary locking device is provided for locking the tare poise and indicator.

7. A tare poise setting and indicating device for a slidable poise carried by a tare beam, comprising a rack connected to said poise, a pinion enmeshing therewith, a second pinion connected to the first pinion, a third pinion enmeshing with the second pinion and connected to a rotatable shaft, a setting knob carried by the shaft adapted to be grasped and turned by the operation, a supplementary gear train for driving the indicator, said train comprising a pair of gears coaxial with the aforesaid second and third pinions, and a pointer connected to one of said gears for indicating the offset load for the varying poise positions.

In testimony whereof we hereto affix our signatures.

LOUIS A. OSGOOD.
ELMER E. WOLF.